US009415308B1

(12) United States Patent
Zepp et al.

(10) Patent No.: US 9,415,308 B1
(45) Date of Patent: Aug. 16, 2016

(54) DAISY CHAINING OF TOURNAMENT AUDIO CONTROLLERS (71) Applicant: Voyetra Turtle Beach, Inc., Valhalla, NY (US)

(72) Inventors: David Zepp, Poway, CA (US); Travis Kettering, San Mateo, CA (US)

(73) Assignee: Voyetra Turtle Beach, Inc., Valhalla, NY (US)

( * ) Notice: Subject to any disclaimer, the term of this patent is extended or adjusted under 35 U.S.C. 154(b) by 0 days.

(21) Appl. No.: 14/821,109

(22) Filed: Aug. 7, 2015

(51) Int. Cl.
*G06F 17/00* (2006.01)
*A63F 13/25* (2014.01)
*H04R 3/00* (2006.01)
*G10K 11/178* (2006.01)

(52) U.S. Cl.
CPC ............ *A63F 13/25* (2014.09); *G10K 11/1788* (2013.01); *H04R 3/00* (2013.01); *G10K 2210/1082* (2013.01); *G10K 2210/3044* (2013.01)

(58) Field of Classification Search
CPC ..... G07F 17/32; G07F 17/3276; A63F 13/08; A63F 13/10; A63F 2300/308; A63F 2300/8047; G10H 1/32; G10H 2220/135
See application file for complete search history.

(56) References Cited

U.S. PATENT DOCUMENTS

| 8,123,618 | B2* | 2/2012 | Karmarkar | G07F 17/32 463/10 |
| 2005/0239546 | A1* | 10/2005 | Hedrick | G07F 17/0014 463/29 |
| 2008/0311986 | A1* | 12/2008 | Reiss | A63F 13/02 463/35 |
| 2010/0131269 | A1* | 5/2010 | Park | G10K 11/178 704/233 |

* cited by examiner

*Primary Examiner* — Fan Tsang
*Assistant Examiner* — Eugene Zhao
(74) *Attorney, Agent, or Firm* — McAndrews Held & Malloy (57) ABSTRACT A method and system for daisy chaining tournament audio controllers, where the method comprises, in a headset coupled to a first tournament audio controller (TAC), the first TAC being in a daisy chain of TACs: receiving a chat signal from a previous TAC in the daisy chain of TACs, receiving a microphone signal from a microphone in the headset, summing the chat signal with the microphone signal, communicating the summed signal to a next TAC in the daisy chain, and communicating the chat signal to the headset. The microphone signal may be removed from the summed chat signal and microphone signal by adding a second microphone signal 180 degrees out of phase with the microphone signal. The chat signal may be summed with the microphone signal at an amplitude set by a user of the headset after the removal of the microphone signal.

20 Claims, 9 Drawing Sheets

DAISY CHAINING OF TOURNAMENT AUDIO CONTROLLERS

CLAIM OF PRIORITY

N/A

INCORPORATION BY REFERENCE

N/A

TECHNICAL FIELD

Aspects of the present application relate to audio headsets, and more specifically, to methods and systems for daisy chaining tournament audio controllers.

BACKGROUND

Limitations and disadvantages of conventional approaches to headset networking will become apparent to one of skill in the art, through comparison of such approaches with some aspects of the present method and system set forth in the remainder of this disclosure with reference to the drawings.

BRIEF SUMMARY

Methods and systems are provided for daisy chaining tournament audio controllers, substantially as illustrated by and/or described in connection with at least one of the figures, as set forth more completely in the claims.

DETAILED DESCRIPTION

Certain aspects of the disclosure may be found in daisy chaining tournament audio controllers. Example aspects of the disclosure may comprise, in a headset coupled to a first tournament audio controller (TAC), where the first TAC is in a daisy chain of TACs: receiving a chat signal from a previous TAC in the daisy chain of TACs, receiving a microphone signal from a microphone in the headset, summing the chat signal with the microphone signal, communicating the summed chat signal and microphone signal to a next TAC in the daisy chain if the first TAC is not at an end of the daisy chain of TACs, and communicating the chat signal to the headset. The microphone signal may be removed from the summed chat signal and microphone signal by adding a second microphone signal 180 degrees out of phase with the microphone signal. The chat signal may be summed with the microphone signal at an amplitude set by a user of the headset after the removal of the microphone signal from the summed chat signal and microphone signal. The summed chat signal and microphone signal (summed at an amplitude set by the user) may be communicated to the headset. The summed chat signal and microphone signal may be communicated to the previous TAC in the daisy chain if the first TAC is at an end of the daisy chain of TACs. A signal from a gaming console may be summed with the summed chat signal and microphone signal. Each TAC in the daisy chain of TACs may be coupled to a headset. The chat signal may comprise audio from the headsets coupled to each of the TACs in the daisy chain. The received chat signal may be converted from a differential signal to a single-ended signal before being summed with the microphone signal.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

Figure 1A:
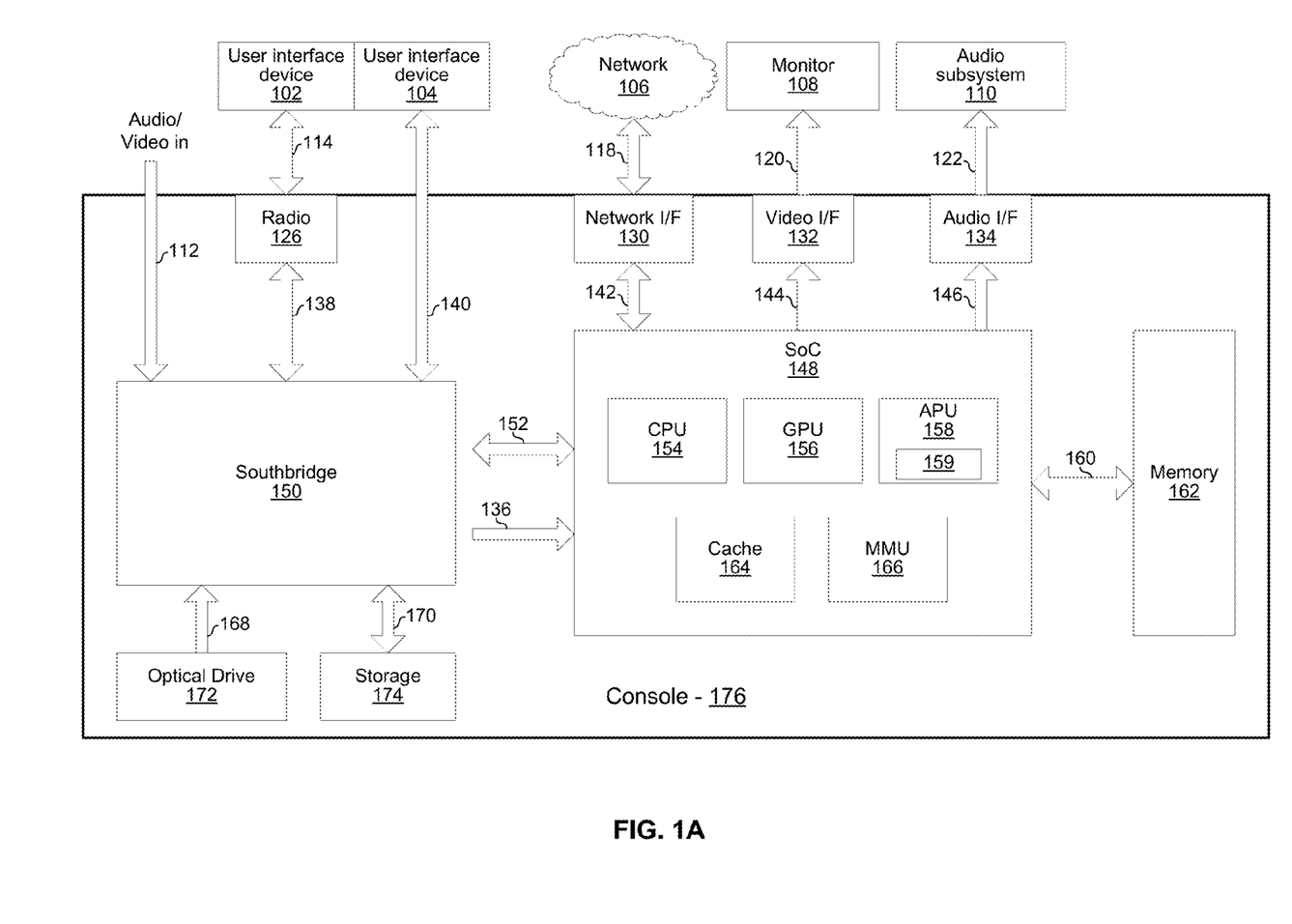
FIG. 1A depicts an example gaming console.

Referring to FIG. 1A, there is shown game console 176 which may be, for example, a Windows computing device, a Unix computing device, a Linux computing device, an Apple OSX computing device, an Apple iOS computing device, an Android computing device, a Microsoft Xbox, a Sony Playstation, a Nintendo Wii, or the like. The example game console 176 comprises a radio 126, network interface 130, video interface 132, audio interface 134, southbridge 150, main system on chip (SoC) 148, memory 162, optical drive 172, and storage device 174. The SoC 148 comprises central processing unit (CPU) 154, graphics processing unit (GPU) 156, audio processing unit (APU) 158, cache memory 164, and memory management unit (MMU) 166. The various components of the game console 176 are communicatively coupled through various busses/links 136, 138, 142, 144, 146, 152, 160, 169, and 170.

The southbridge 150 comprises circuitry that supports one or more data bus protocols such as High-Definition Multimedia Interface (HDMI), Universal Serial Bus (USB), Serial Advanced Technology Attachment 2 (SATA 2), embedded multimedia card interface (e.MMC), Peripheral Component Interconnect Express (PCIe), or the like. The southbridge 150 may receive audio and/or video from an external source via link 112 (e.g., HDMI), from the optical drive (e.g., Blu-Ray) 172 via link 168 (e.g., SATA 2), and/or from storage 174 (e.g., hard drive, FLASH memory, or the like) via link 170 (e.g., SATA 2 and/or e.MMC). Digital audio and/or video is output to the SoC 148 via link 136 (e.g., CEA-861-E compliant video and IEC 61937 compliant audio). The southbridge 150 exchanges data with radio 126 via link 138 (e.g., USB), with external devices via link 140 (e.g., USB), with the storage 174 via the link 170, and with the SoC 148 via the link 152 (e.g., PCIe).

The radio 126 comprises circuitry operable to communicate in accordance with one or more wireless standards such as the IEEE 802.11 family of standards, the Bluetooth family of standards, and/or the like.

The network interface 130 may comprise circuitry operable to communicate in accordance with one or more wired standards and to convert between wired standards. For example, the network interface 130 may communicate with the SoC 148 via link 142 using a first standard (e.g., PCIe) and may communicate with the network 106 using a second standard (e.g., gigabit Ethernet).

The video interface 132 may comprise circuitry operable to communicate video in accordance with one or more wired or wireless video transmission standards. For example, the video interface 132 may receive CEA-861-E compliant video data via link 144 and encapsulate/format/etc., the video data in accordance with an HDMI standard for output to the monitor 108 via an HDMI link 120.

The audio interface 134 may comprise circuitry operable to communicate audio in accordance with one or more wired or wireless audio transmission standards. For example, the audio interface 134 may receive CEA-861-E compliant video data via link 144 and encapsulate/format/etc. The video data in accordance with an HDMI standard for output to the monitor 108 via an HDMI link 120.

The central processing unit (CPU) 154 may comprise circuitry operable to execute instructions for controlling/coordinating the overall operation of the game console 176. Such instructions may be part of an operating system of the console and/or part of one or more software applications running on the console.

The graphics processing unit (GPU) 156 may comprise circuitry operable to perform graphics processing functions such as compression, decompression, encoding, decoding, 3D rendering, and/or the like.

The audio processing unit (APU) 158 may comprise circuitry operable to perform audio processing functions such as volume/gain control, compression, decompression, encoding, decoding, surround-sound processing, and/or the like to output single channel or multi-channel (e.g., 2 channels for stereo or 5, 7, or more channels for surround sound) audio signals. The APU 158 comprises memory (e.g., volatile and/or non-volatile memory) 159 which stores parameter settings that affect processing of audio by the APU 158. For example, the parameter settings may include a first audio gain/volume setting that determines, at least in part, a volume of game audio output by the console 176 and a second audio gain/volume setting that determines, at least in part, a volume of chat audio output by the console 176. The parameter settings may be modified via a graphical user interface (GUI) of the console and/or via an application programming interface (API) provided by the console 176.

The cache memory 164 comprises high-speed memory (typically DRAM) for use by the CPU 154, GPU 156, and/or APU 158. The memory 162 may comprise additional memory for use by the CPU 154, GPU 156, and/or APU 158. The memory 162, typically DRAM, may operate at a slower speed than the cache memory 164 but may also be less expensive than cache memory as well as operate at a higher-speed than the memory of the storage device 174. The MMU 166 controls accesses by the CPU 154, GPU 156, and/or APU 158 to the memory 162, the cache 164, and/or the storage device 174.

In FIG. 1A, the example game console 176 is communicatively coupled to a user interface device 102, a user interface device 104, a network 106, a monitor 108, and audio subsystem 110.

Each of the user interface devices 102 and 104 may comprise, for example, a game controller, a keyboard, a motion sensor/position tracker, or the like. The user interface device 102 communicates with the game console 176 wirelessly via link 114 (e.g., Wi-Fi Direct, Bluetooth, and/or the like). The user interface device 102 communicates with the game console 176 via the wired link 140 (e.g., USB or the like).

The network 160 comprises a local area network and/or a wide area network. The game console 176 communicates with the network 106 via wired link 118 (e.g., gigabit Ethernet).

The monitor 108 may be, for example, a LCD, OLED, or PLASMA screen. The game console 176 sends video to the monitor 108 via link 120 (e.g., HDMI).

The audio subsystem 110 may be, for example, a headset, a combination of headset and audio basestation, or a set of speakers and accompanying audio processing circuitry. The game console 176 sends audio to the subsystem 110 via link(s) 122 (e.g., S/PDIF for digital audio or "line out" for analog audio). In an example scenario, the audio subsystem 110 comprises a tournament audio controller (TAC), which provides closed-system chat capability for a plurality of users. In addition the TAC may be daisy-chained to provide a chat environment for more users. Each TAC may be operable to receive chat audio from one or more headsets with microphones as well as from other TACs, and may provide an out-of-phase cancelling effect to remove a user's voice from their own audio signal while provising chat audio from all the other users. Additional details of an example tournament audio controller are described below.

Figure 1B:
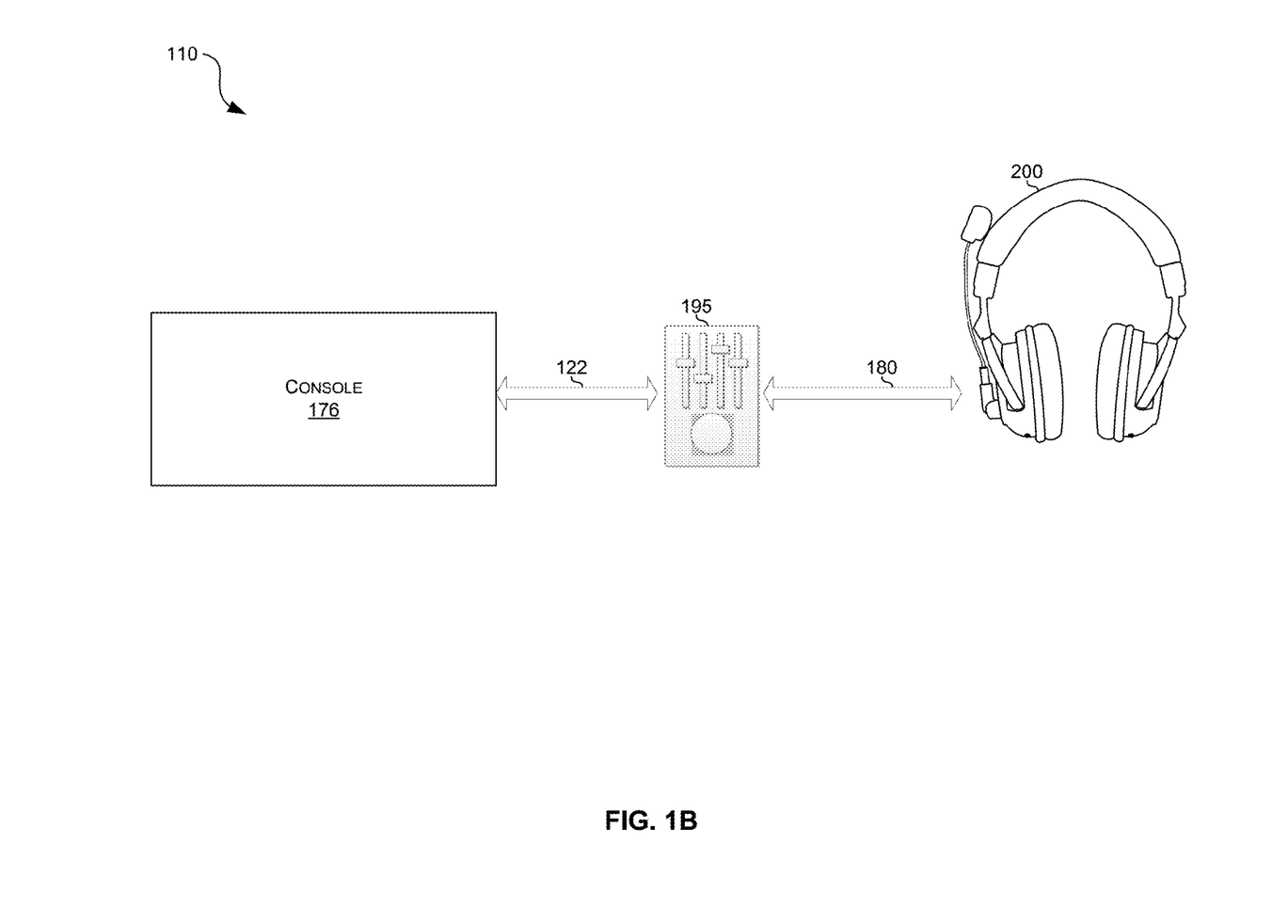
FIG. 1B depicts an example gaming audio subsystem comprising a headset and a tournament audio controller.

FIG. 1B depicts an example gaming audio subsystem comprising a headset and a tournament audio controller. Shown are a headset 200 and a TAC 195. The headset 200 communicates with the TAC 195 via a link 180 and the TAC 195 communicates with the console 176 via a link 122. The link 122 may be as described above. In an example implementation, the link 180 may be a proprietary wireless link operating in an unlicensed frequency band. In another example scenario, the link 180 may comprise a wired connection. The headset 200 may be as described below with reference to FIGS. 2A-2C.

In gaming tournaments there are teams of multiple players who compete against each other. During the game play, the mic signal from each player needs to be heard by every other player on the team. By simply mixing all of the microphone signals together and distributing the summed mics to every player, each player would have his own microphone mixed in and hear himself at a fixed level. That player would not be able to cancel out his own microphone signal. A chat loop in accordance with the disclosure fixes this issue. The TAC 195 may enable a chat loop and may be daisy-chained with TACs for other users in a loop.

Referring to FIG. 1C, again shown is the console 176 connected to a plurality of peripheral devices and a network 106. The example peripheral devices shown include a monitor 108, a user interface device 102, a headset 200, an audio TAC 195, and a multi-purpose device 192. The TAC 195 may be operable to provide private chat capability for a number of users, and may be daisy-chained with other TACs depending on the desired number of users.

The monitor 108 and user interface device 102 are as described above. An example implementation of the headset 200 is described below with reference to FIGS. 2A-2C.

Figure 1C:
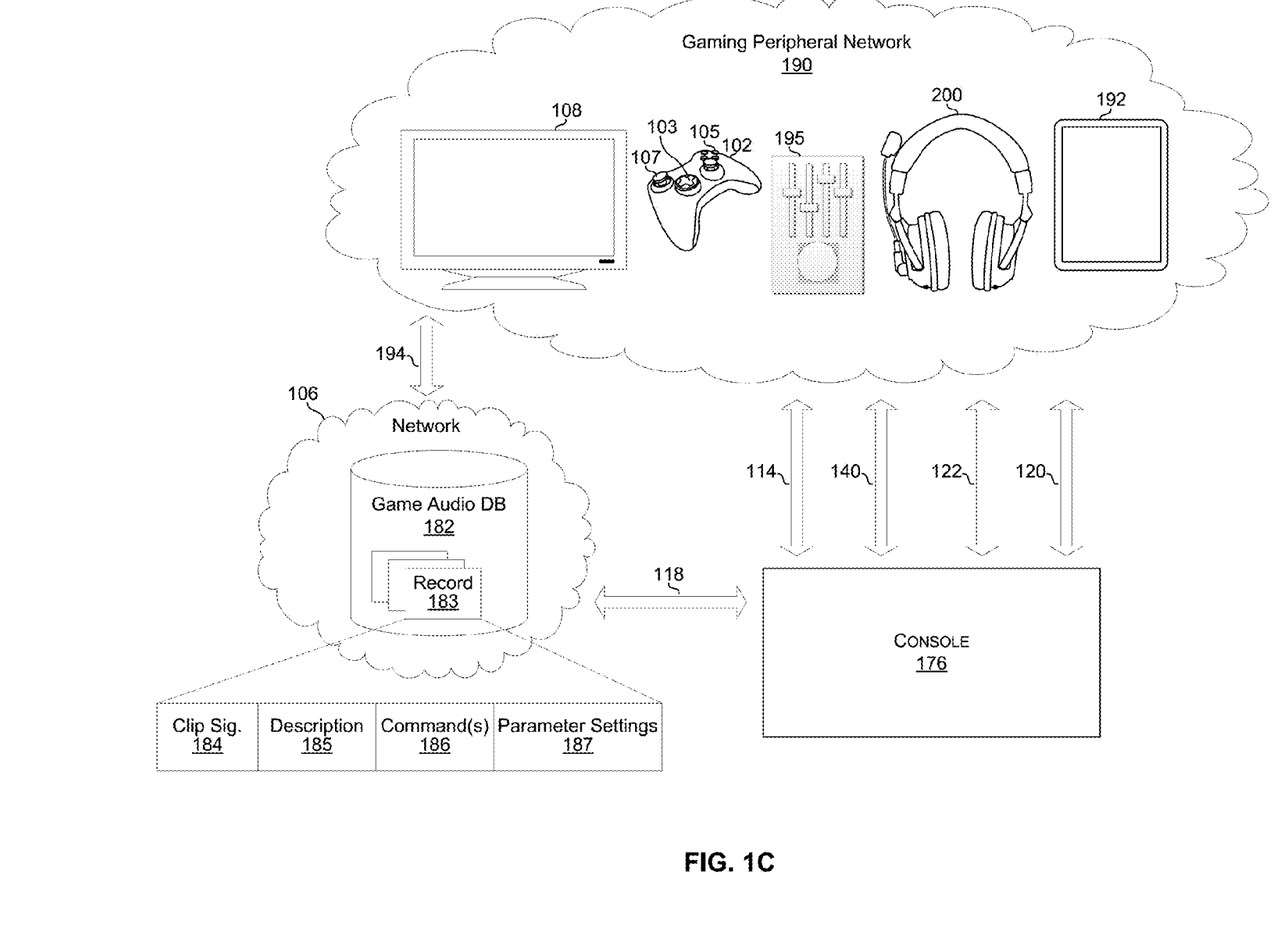
FIG. 1C depicts the example gaming console and an associated network of peripheral devices.

The multi-purpose device 192 may be, for example, a tablet computer, a smartphone, a laptop computer, or the like that runs an operating system such as Android, Linux, Windows, iOS, OSX, or the like. Hardware (e.g., a network adaptor) and software (i.e., the operating system and one or more applications loaded onto the device 192) may configure the device 192 for operating as part of the GPN 190. For example, an application running on the device 192 may cause display of a graphical user interface via which a user can access gaming-related data, commands, functions, parameter settings, etc. and via which the user can interact with the console 176 and the other devices of the GPN 190 to enhance his/her gaming experience.

The peripheral devices 102, 108, 192, 195, and 200 are in communication with one another via a plurality of wired and/or wireless links (represented visually by the placement of the devices in the cloud of GPN 190). Each of the peripheral devices in the gaming peripheral network (GPN) 190 may communicate with one or more others of the peripheral devices in the GPN 190 in a single-hop or multi-hop fashion. For example, the headset 200 may communicate with the TAC 195 in a single hop (e.g., over a proprietary RF link) and with the device 192 in a single hop (e.g., over a Bluetooth or Wi-Fi direct link), while the tablet may communicate with the TAC 195 in two hops via the headset 200. As another example, the user interface device 102 may communicate with the headset 200 in a single hop (e.g., over a Bluetooth or Wi-Fi direct link) and with the device 192 in a single hop (e.g., over a Bluetooth or Wi-Fi direct link), while the device 192 may communicate with the headset 200 in two hops via the user interface device 102. These example interconnections among the peripheral devices of the GPN 190 are merely examples, any number, combinations and/or types of links among the devices of the GPN 190 is possible.

The GPN 190 may communicate with the console 176 via any one or more of the connections 114, 140, 122, and 120 described above. The GPN 190 may communicate with a network 106 via one or more links 194 each of which may be, for example, Wi-Fi, wired Ethernet, and/or the like.

A database 182 which stores gaming audio data is accessible via the network 106. The gaming audio data may comprise, for example, signatures of particular audio clips (e.g., individual sounds or collections or sequences of sounds) that are part of the game audio of particular games, of particular levels/scenarios of particular games, particular characters of particular games, etc. In an example implementation, the database 182 may comprise a plurality of records 183, where each record 183 comprises an audio clip (or signature of the clip) 184, a description of the clip 184 (e.g., the game it is from, when it occurs in the game, etc.), one or more gaming commands 186 associated with the clip, one or more parameter settings 187 associated with the clip, and/or other data associated with the audio clip. Records 183 of the database 182 may be downloadable to, or accessed in real-time by, one or more devices of the GPN 190.

In an example scenario, the headset 200 may communicate with the gaming console 176 via the TAC 195, with the TAC 195 coupled to a plurality of users and other TACs. The TAC 195 may combine multiple audio inputs while subtracting out specific audio for certain outputs, such as a user's voice in their own headset. The daisy-chaining of the TAC 195 with other TACS provides secure chat capability for a configurable number of users.

While the headset 200 in FIGS. 1A-1C is shown communicating with a gaming console 176, the disclosure is not so limited, as this is merely an example use for the headset 200. Accordingly, the headset 200 may be utilized in other applications, such as a cellular phone headset, music player headset, or as a headset in any other communications application and/or protocol where multiple users may want to communicate concurrently.

Figure 2A:
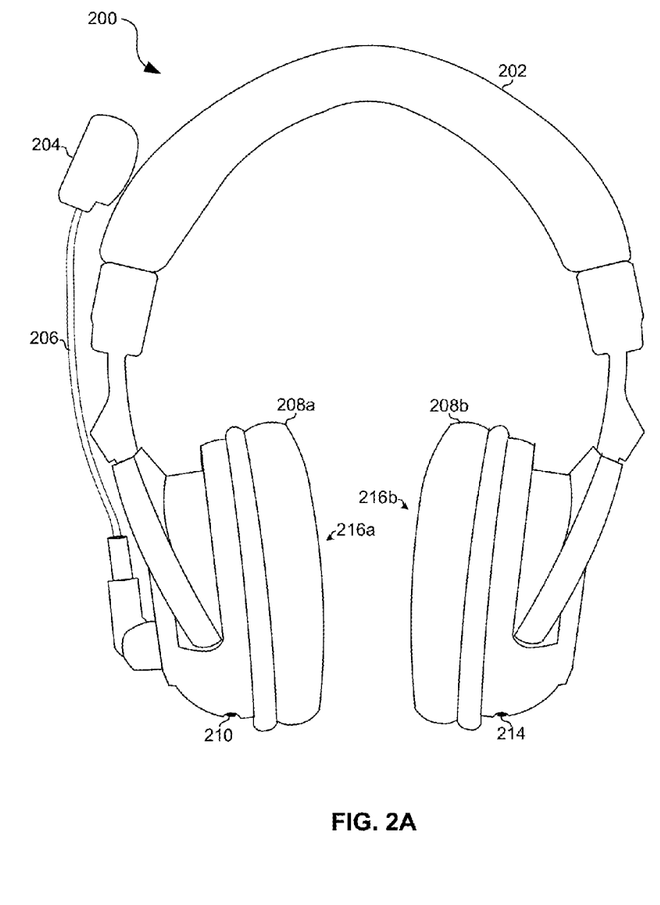
FIGS. 2A and 2B depict two views of an example embodiment of a gaming headset.
Figure 2B:
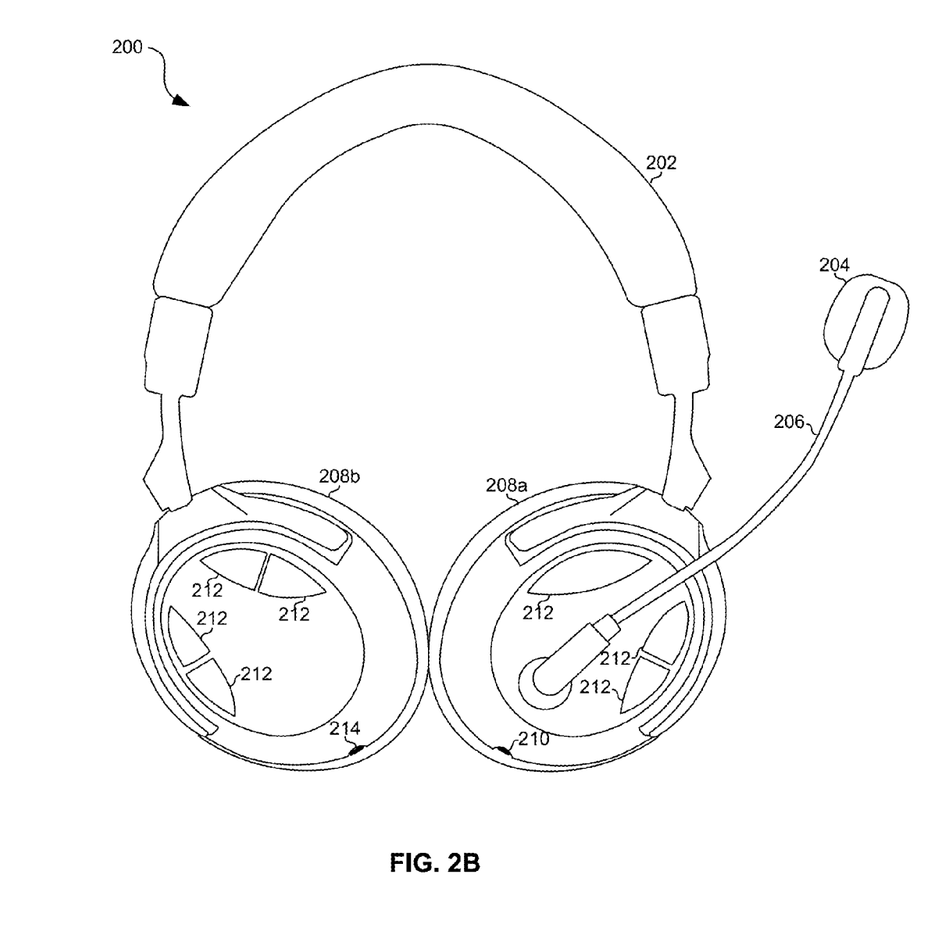

Referring to FIGS. 2A and 2B, there is shown two views of an example headset 200 that may present audio output by a gaming console such as the console 176 and/or may be coupled to a TAC such as the TAC 195. The headset 200 comprises a headband 202, a microphone boom 206 with microphone 204, ear cups 208a and 208b which surround speakers 216a and 216b, connector 210, connector 214, and user controls 212.

The connector 210 may be, for example, a 3.5 mm headphone socket for receiving analog audio signals (e.g., receiving chat audio via an Xbox "talkback" cable).

The microphone 204 converts acoustic waves (e.g., the voice of the person wearing the headset) to electric signals for processing by circuitry of the headset and/or for output to a device (e.g., console 176, TAC 195, a smartphone, and/or the like) that is in communication with the headset.

The speakers 216a and 216b convert electrical signals to sound waves.

The user controls 212 may comprise dedicated and/or programmable buttons, switches, sliders, wheels, etc., for performing various functions. Example functions which the controls 212 may be configured to perform include: power the headset 200 on/off, mute/unmute the microphone 204, control gain/volume of, and/or effects applied to, chat audio by the audio processing circuitry of the headset 200, control gain/volume of, and/or effects applied to, game audio by the audio processing circuitry of the headset 200, enable/disable/initiate pairing (e.g., via Bluetooth, Wi-Fi direct, or the like) with another computing device, and/or the like.

The connector 214 may be, for example, a USB port. The connector 214 may be used for downloading data to the headset 200 from another computing device and/or uploading data from the headset 200 to another computing device. Such data may include, for example, parameter settings (described below). Additionally, or alternatively, the connector 214 may be used for communicating with another computing device such as a smartphone, tablet compute, laptop computer, or the like.

In an example scenario, the headset 200 may be coupled to a TAC, such as the TAC 195, for chat communications with a plurality of users, which may be suitable for a gaming tournament situation, for example.

Figure 2C:
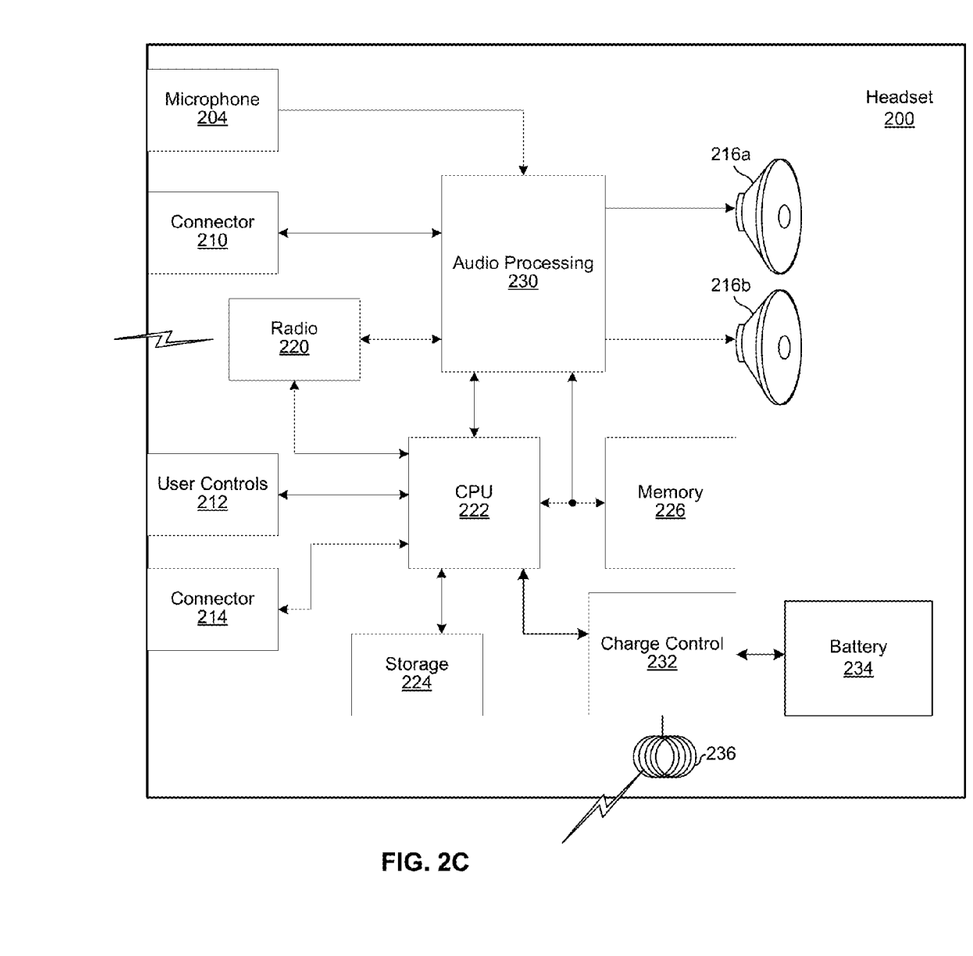
FIG. 2C depicts a block diagram of the example headset of FIGS. 2A and 2B.

FIG. 2C depicts a block diagram of the example headset 200. In addition to the connector 210, user controls 212, connector 214, microphone 204, and speakers 216a and 216b already discussed, shown are a radio 220, a CPU 222, a storage device 224, a memory 226, an audio processing circuit 230, a charge control module 232, a battery 234, and an induction coil 236.

The radio 220 may comprise radio frequency (RF) circuitry operable to communicate in accordance with one or more standardized (such as, for example, the IEEE 802.11 family of standards, the Bluetooth family of standards, and/or the like) and/or proprietary wireless protocol(s) (e.g., a proprietary protocol for receiving audio from an audio basestation such as the TAC 195).

The CPU 222 may comprise circuitry operable to execute instructions for controlling/coordinating the overall operation of the headset 200. Such instructions may be part of an operating system or state machine of the headset 200 and/or part of one or more software applications running on the headset 200. In some implementations, the CPU 222 may be, for example, a programmable interrupt controller, a state machine, or the like.

The storage device 224 may comprise, for example, FLASH or other nonvolatile memory for storing data which may be used by the CPU 222 and/or the audio processing circuitry 230. Such data may include, for example, parameter settings that affect processing of audio signals in the headset 200 and parameter settings that affect functions performed by the user controls 212. For example, one or more parameter settings may determine, at least in part, a gain of one or more gain elements of the audio processing circuitry 230. As another example, one or more parameter settings may determine, at least in part, a frequency response of one or more filters that operate on audio signals in the audio processing circuitry 230.

Example parameter settings which affect audio processing are described in the co-pending U.S. patent application Ser. No. 13/040,144 titled "Gaming Headset with Programmable Audio" and published as US2012/0014553, the entirety of which is hereby incorporated herein by reference. Particular parameter settings may be selected autonomously by the headset 200 in accordance with one or more algorithms, based on user input (e.g., via controls 212), and/or based on input received via one or more of the connectors 210 and 214.

The memory 226 may comprise volatile memory used by the CPU 230 and/or audio processing circuit 230 as program memory, for storing runtime data, etc.

The audio processing circuit 230 may comprise circuitry operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 230 may be determined, at least in part, by which parameter settings have been selected. The processing may be performed on game, chat, and/or microphone audio that is subsequently output to speaker 216a and 216b. Additionally, or alternatively, the processing may be performed on chat audio that is subsequently output to the connector 210 and/or radio 220.

The charge control module 232 may comprise suitable circuitry, logic, and/or code for controlling the charging of the battery 234. Accordingly, the charge control module 232 may receive electrical current from the induction coil 236, which in turn receives electromagnetic energy from a charging induction coil in the charging station via inductive coupling. The charge control module may also receive instructions from the CPU 222, which may receive instructions from a charging station via the radio 230.

In an example scenario, an alternating current in the induction coil 236 may be utilized by the charge control module 232 to charge the battery 234. In this manner, the battery 234 may be charged without the need for any physical connection to a charging station, but merely by being in close proximity, with the distance determined by the induction coil 236 and associated coil in the charging station. Furthermore, the headset 200 may receive commands wirelessly from the charging station in which the headset is placed, as shown in FIGS. 3 and 4.

Figure 3:
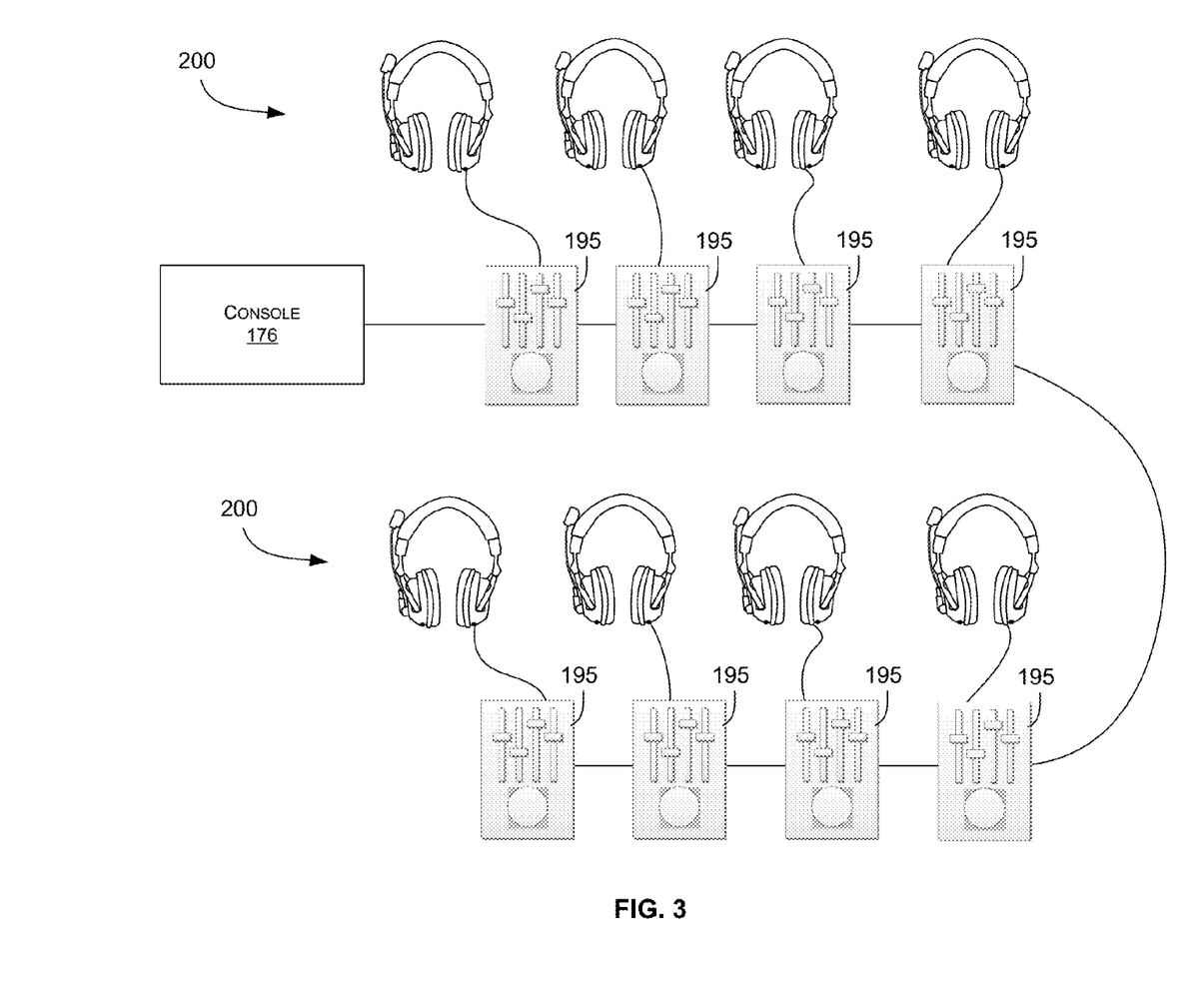
FIG. 3 depicts headsets coupled to daisy-chained tournament audio controllers.
Figure 4:
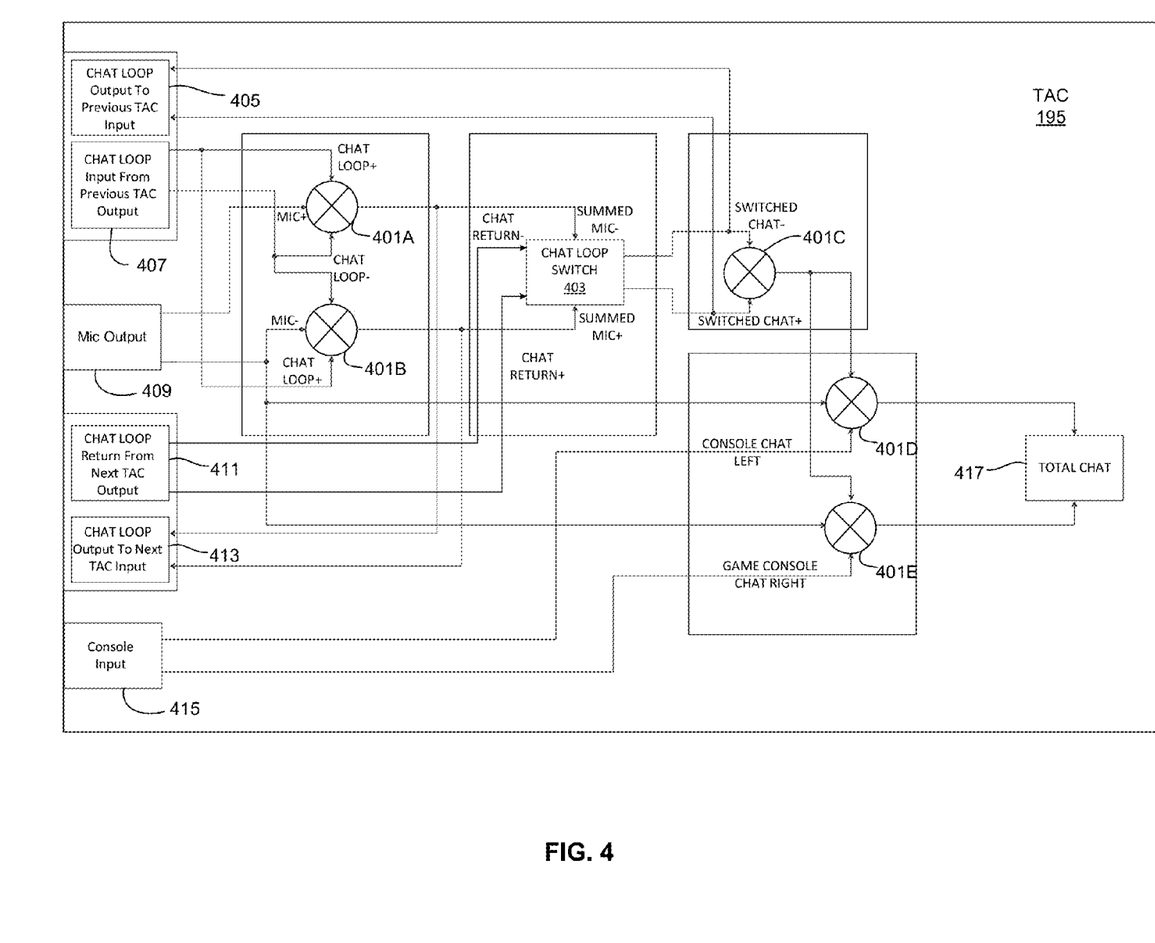
FIG. 4 depicts a schematic of a tournament audio controller, in accordance with an example embodiment of the disclosure.

FIG. 3 depicts headsets coupled to daisy-chained tournament audio controllers. Referring to FIG. 3, there is shown gaming console 176, daisy-chained TACs 195A and 195B, and a plurality of headsets 200. The TACs 195A and 195B may comprise suitable circuitry, logic, and/or code that is operable to combine audio signals from a plurality of sources while eliminating some signals using out-of-phase cancellation.

As stated previously, in gaming tournaments there are teams of multiple players who compete against each other. During the game play, the mic signal from each player needs to be heard by every other player on the team. By simply mixing all of the microphone signals together and distributing the summed mics to every player, each player would have his own microphone mixed in and hear himself at a fixed level. That player would not be able to cancel out his own microphone signal.

In an example scenario, in tournament play each player has his or her own TAC 195 coupled to their headset. The TACs 195A and 195B may receive audio signals from the game console 176 as well as audio signals from microphones in the headsets 200. The TACs 195 allow for the gamer to adjust via the four sliders the game/chat ratio, microphone noise gate for the reduction of background noise, microphone level, and microphone monitor. A knob may provide volume control. The microphone monitor function is discussed further with respect to FIG. 4, and enables a chat loop with multiple players while configuring the sound heard by each user as desired without their own voice at the same volume as other users. The microphone monitor allows the user to adjust the amount of his own microphone that gets mixed back in to his own headset so he may hear him or herself.

As shown in FIG. 3, multiple TACs 195 may be coupled together in a daisy chain configuration. The microphone output from the headset may pass from the first TAC to the second TAC. When it is received by the second TAC, the microphone signal of the first TAC may be summed with the microphone signal of the second unit and passed to the third. This continues until the last unit. The TACs 195 may detect if a cable is plugged into another unit so that each unit knows if it is in the middle or at the end of chain. If it is detected that it is the last TAC, then the last TAC will take all the summed microphone signals and pass them back to the previous TAC. In turn each TAC will pass the summed signals back to the previous TAC until it gets back to the first TAC.

Because the summed microphone signals get passed back to the previous TAC, each TAC 195 will hear the Chat Loop Audio that contains every player's voice. Each TAC 195 will receive the total Chat Audio and then mix in the microphone of the user at the same amplitude but 180 degrees out of phase, which cancels his or her own voice from the Chat Loop inside his or her own TAC 195. Then the Microphone signal may be mixed in at the level at which the user sets the Mic Monitor fader control.

FIG. 4 depicts a schematic of a tournament audio controller, in accordance with an example embodiment of the disclosure. Referring to FIG. 4, there is shown an example schematic of TAC 195 comprising summers 401A-401E, a chat loop switch 403, and a plurality of input/output (I/O) terminals, indicated by the boxes at the left side of the TAC 195 in FIG. 4.

The summers 401A-40-1E may comprise suitable circuitry, logic, and/or code that is operable to receive a plurality of input signals and provide an output signal that is a sum of the input signals. For example, the summer 401A may receive the positive signal from the microphone output 409, the positive signal from the Chat Loop from the previous TAC, and the negative chat loop signal from the previous TAC Output 407, and generate an output that is the sum of these signals, the sum being communicated to the chat loop switch 403 and also back to the Chat Loop Output to Next TAC Input 413. The summers 401A-401E may also be operable to convert a differential input to a single-ended output. In addition, the summers 401A-401E may configure the gain level of each input based on the user settings so that a user may select the volume of their own voice in the chat loop mix, for example.

The chat loop switch 403 may comprise suitable circuitry, logic, and/or code that is operable to switch signals based on what position it has in a chain of TACs. In an example scenario where a plurality of TACs are daisy-chained, each TAC sends the summed audio to the next TAC, as shown the feedback path from the outputs of the mixers 401A and 401B, the CHAT LOOP Output to next TAC input 413. The chat loop switch 403 may either send the Summed Chat audio back to the Previous TAC if it is the last TAC, as shown by the CHAT LOOP Output to Previous TAC Input 405, or may take the audio from the next TAC, the Chat Loop Return from Next TAC Output 411, and send it to the previous TAC if it is not the last in the chain.

In an example scenario, the microphone output 409 comprises a balanced output with the + and − signals being communicated to the summers 401A and 401B, which results in a differential to single-ended conversion with an 180 degree inversion. Because the summed microphone signals get passed back to the previous TAC, each TAC will hear the Chat Loop Audio that contains every player's voice. In addition, due to the balanced output of the microphone, the signal may be canceled at another portion of the TAC 195 by summing signals with 180 degree phase difference.

Each TAC may receive the total Chat Audio and then mix in the microphone of the user at the same or adjusted amplitude 180 degrees out of phase at the summers 401D and 401E. This may configure the magnitude of, or cancel entirely, the user's own voice from the Chat Loop inside their own TAC 195, after which the Microphone signal may be mixed in at the level at which the user sets the Mic Monitor fader control. In this manner, the summers 401D and 401E may configure the volume of the user's own microphone signal for their headset.

In addition, the console input 415 may be summed with the chat loop by the summers 401D and 401E. In an example scenario, each TAC in the daisy chain may be coupled to a game console that provides an audio signal corresponding to the user's activity so that each user hears their own game sound signal and the same chat loop signal as other users but with their own voice mixed in as configured by the user.

The total chat 417 may be communicated to the user headset or to a digital signal processor (DSP) for further processing.

Figure 5:
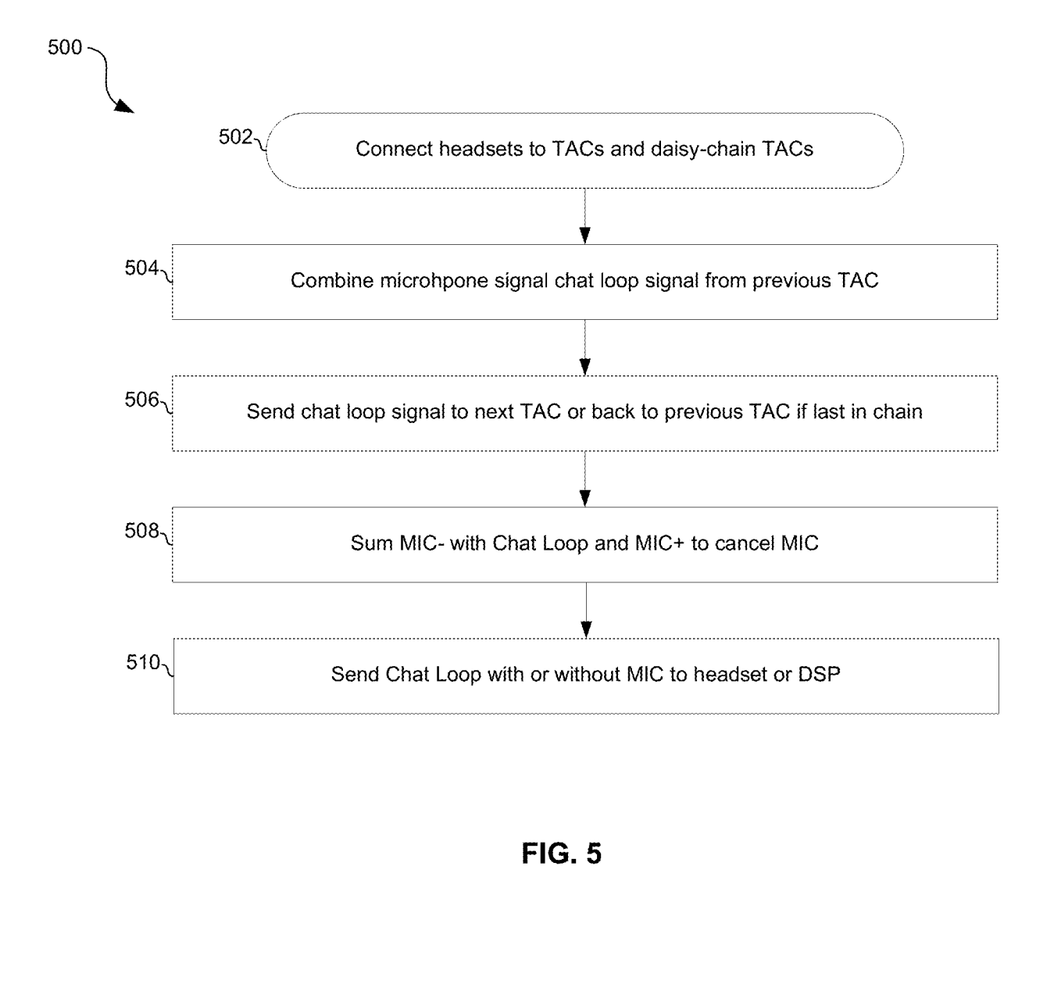
FIG. 5 is a flowchart illustrating an example process for daisy chaining tournament audio controllers.

FIG. 5 is a flowchart illustrating an example process for daisy chaining tournament audio controllers. Referring to FIG. 5, there is shown a flow chart 500, comprising a plurality of example steps.

In starting step 502, a headset may be coupled to each TAC, each of which may be daisy-chained with the other TACs. In step 504, the microphone signal from the user of a particular TAC may be summed with the chat loop signal received from the previous TAC, resulting in single-ended inverted signals from the MIC+ and MIC− signals.

In step 506, the MIC+chat loop audio may be sent to the next TAC or the chat loop audio may be communicated back to the previous TAC if last in the chain.

In step 508, the MIC− signal may be summed with the chat loop+MIC+ signal, and the console input to cancel the MIC signal and result in the chat loop signal. In step 510, the resulting chat loop signal may be communicated to the associated headset or to a DSP for further processing before being communicated to the headset.

In an example embodiment of the disclosure daisy chaining tournament audio controllers are disclosed and may comprise a headset coupled to a first tournament audio controller (TAC), where the first TAC being is in a daisy chain of TACs. The headset is operable to: receive a chat signal from a previous TAC in the daisy chain of TACs, receive a microphone signal from a microphone in the headset, sum the chat signal with the microphone signal, communicate the summed chat signal and microphone signal to a next TAC in the daisy chain if the first TAC is not at an end of the daisy chain of TACs, and communicate the chat signal to the headset.

The microphone signal may be removed from the summed chat signal and microphone signal by adding a second microphone signal 180 degrees out of phase with the microphone signal. The chat signal may be summed with the microphone signal at an amplitude set by a user of the headset after the removal of the microphone signal from the summed chat signal and microphone signal. The summed chat signal and microphone signal (summed at an amplitude set by the user) may be communicated to the headset.

The summed chat signal and microphone signal may be communicated to the previous TAC in the daisy chain if the first TAC is at an end of the daisy chain of TACs. A signal from a gaming console may be summed with the summed chat signal and microphone signal. Each TAC in the daisy chain of TACs may be coupled to a headset. The chat signal may comprise audio from the headsets coupled to each of the TACs in the daisy chain. The received chat signal may be converted from a differential signal to a single-ended signal before being summed with the microphone signal. The microphone signal may comprise a balanced signal.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system for processing audio signals, the system comprising:
   a headset operatively coupled to a first tournament audio controller (TAC), said first TAC being in a daisy chain of TACs, said first TAC being operable to:
   receive a chat signal from a previous TAC in said daisy chain of TACs;
   receive a microphone signal from a microphone in said headset;
   sum said chat signal with said microphone signal;
   communicate said summed chat signal and microphone signal to a next TAC in said daisy chain if said first TAC is not at an end of said daisy chain of TACs;
   communicate, utilizing a chat loop switch in said first TAC, a chat signal from a next TAC to said previous TAC in said daisy chain if said first TAC is not at an end of said daisy chain of TACs;
   communicate, utilizing said chat loop switch, said summed chat signal and microphone signal to said previous TAC if said first TAC is at an end of said daisy chain; and
   communicate said chat signal to said headset.

2. The system of claim 1, wherein the first TAC is operable to remove said microphone signal from said summed chat signal and microphone signal by adding a second microphone signal 180 degrees out of phase with said microphone signal.

3. The system of claim 2, wherein the first TAC is operable to sum said chat signal with said microphone signal at an amplitude set by a user of said headset after said removal of said microphone signal from said summed chat signal and microphone signal.

4. The system of claim 3, wherein the first TAC is operable to communicate said summed chat signal and microphone signal at an amplitude set by said user to said headset.

5. The system of claim 1, wherein said chat loop switch is coupled to two summers, each of which is coupled to a separate terminal of said microphone.

6. The system of claim 1, wherein the first TAC is operable to sum a signal from a gaming console with said summed chat signal and microphone signal.

7. The system of claim 1, wherein each TAC in said daisy chain of TACs is coupled to a headset.

8. The system of claim 7, wherein said chat signal comprises audio from said headsets coupled to each of said TACs in said daisy chain.

9. The system of claim 1, wherein said microphone signal is a balanced signal.

10. The system of claim 1, wherein the first TAC is operable to convert said received chat signal from a differential signal to a single-ended signal while being summed with said microphone signal.

11. A method for processing audio signals, the method comprising:
    in a headset coupled to a first tournament audio controller (TAC), said first TAC being in a daisy chain of TACs:
    receiving a chat signal from a previous TAC in said daisy chain of TACs;
    receiving a microphone signal from a microphone in said headset;
    summing said chat signal with said microphone signal;
    communicating said summed chat signal and microphone signal to a next TAC in said daisy chain if said first TAC is not at an end of said daisy chain of TACs;
    communicating, utilizing a chat loop switch in said first TAC, a chat signal from a next TAC to said previous TAC in said daisy chain if said first TAC is not at an end of said daisy chain of TACs;
    communicating, utilizing said chat loop switch, said summed chat signal and microphone signal to said previous TAC if said first TAC is at an end of said daisy chain; and
    communicating said chat signal to said headset.

12. The method of claim 11, comprising removing said microphone signal from said summed chat signal and microphone signal by adding a second microphone signal 180 degrees out of phase with said microphone signal.

13. The method of claim 12, comprising summing said chat signal with said microphone signal at an amplitude set by a user of said headset after said removal of said microphone signal from said summed chat signal and microphone signal.

14. The method of claim 13, comprising communicating said summed chat signal and microphone signal at an amplitude set by said user to said headset.

15. The method of claim 11, wherein said chat loop switch is coupled to two summers, each of which is coupled to a separate terminal of said microphone.

16. The method of claim 11, comprising summing a signal from a gaming console with said summed chat signal and microphone signal.

17. The method of claim 11, wherein each TAC in said daisy chain of TACs is coupled to a headset.

18. The method of claim 17, wherein said chat signal comprises audio from said headsets coupled to each of said TACs in said daisy chain.

19. The method of claim 11, comprising converting said received chat signal from a differential signal to a single-ended signal while being summed with said microphone signal.

20. A system for processing audio signals, the system comprising:
    a headset coupled to a first tournament audio controller (TAC), said first TAC being in a daisy chain of TACs, said first TAC being operable to:
    receive a chat signal from a previous TAC in said daisy chain of TACs;
    receive a microphone signal from a microphone in said headset;
    sum said chat signal with said microphone signal;
    communicate said summed chat signal and microphone signal to a next TAC in said daisy chain if said first TAC is not at an end of said daisy chain of TACs;
    communicate, utilizing a chat loop switch in said first TAC, a chat signal from a next TAC to said previous TAC in said daisy chain if said first TAC is not at an end of said daisy chain of TACs;
    communicate, utilizing said chat loop switch, said summed chat signal and microphone signal to said previous TAC if said first TAC is at an end of said daisy chain;
    sum said chat signal with a signal from a gaming console and a second microphone signal 180 degrees out of phase with said microphone signal; and
    communicate said summed chat signal and signal from said gaming console to said headset.

* * * * *